US011235984B2

(12) United States Patent
Kelly et al.

(10) Patent No.: US 11,235,984 B2
(45) Date of Patent: Feb. 1, 2022

(54) WATER TREATMENT DEVICE

(71) Applicant: HOLCIM (AUSTRALIA) PTY LTD, Chatswood (AU)

(72) Inventors: Charles Kelly, Salisbury (AU); Peter Baker, Runcorn (AU); Anton Bardak, Mount Gravatt (AU)

(73) Assignee: Holcim (Australia) Pty Ltd., Chatswood (AU)

( * ) Notice: Subject to any disclaimer, the term of this patent is extended or adjusted under 35 U.S.C. 154(b) by 0 days.

(21) Appl. No.: 17/161,708

(22) Filed: Jan. 29, 2021

(65) Prior Publication Data
US 2021/0163312 A1 Jun. 3, 2021

Related U.S. Application Data

(63) Continuation of application No. PCT/AU2018/000113, filed on Jul. 4, 2018.

(51) Int. Cl.
*C02F 1/28* (2006.01)
*C02F 9/00* (2006.01)
(Continued)

(52) U.S. Cl.
CPC ............ *C02F 1/003* (2013.01); *B01D 24/008* (2013.01); *B01D 35/147* (2013.01); *B01D 36/04* (2013.01);
(Continued)

(58) Field of Classification Search
CPC .......... C02F 1/003; C02F 1/283; C02F 9/005; C02F 2201/004; C02F 1/004;
(Continued)

(56) References Cited

U.S. PATENT DOCUMENTS

2003/0034286 A1\* 2/2003 Butler .................... B01D 29/58
210/163
2008/0277326 A1 11/2008 Hersey et al.
(Continued)

FOREIGN PATENT DOCUMENTS

WO WO-2008104030 A1 \* 9/2008 ........... B01D 21/267
WO 2012045120 A1 4/2012

OTHER PUBLICATIONS

International Search Report and Written Opinion dated Aug. 22, 2018 in connection with International Application No. PCT/AU2018/000113.
(Continued)

*Primary Examiner* — Matthew O Savage
(74) *Attorney, Agent, or Firm* — Cook Alex Ltd.

(57) ABSTRACT

A water treatment device can include a main body in the form of a main chamber and having an upper portion, a lower portion, a main inlet for receiving a flow of water into the main body and a main outlet for discharging a flow of water from the main body. In some embodiments an insert member disposed within the main chamber at the upper portion includes a return and bypass channel providing fluid communication between the main inlet and the main outlet. In some embodiments a filter assembly disposed within the main chamber and below the insert member includes a treatment chamber in fluid communication with the main inlet and is adapted for filtering water that flows through the filter assembly.

20 Claims, 2 Drawing Sheets

(51) Int. Cl.
*C02F 1/00* (2006.01)
*B01D 36/04* (2006.01)
*B01D 24/00* (2006.01)
*B01D 35/147* (2006.01)
*C02F 1/40* (2006.01)
*C02F 103/00* (2006.01)

(52) U.S. Cl.
CPC ............... *C02F 1/283* (2013.01); *C02F 1/40* (2013.01); *C02F 9/00* (2013.01); *C02F 9/005* (2013.01); *B01D 2221/12* (2013.01); *C02F 2103/001* (2013.01); *C02F 2201/004* (2013.01); *C02F 2201/006* (2013.01)

(58) Field of Classification Search
CPC ............... C02F 2103/001; C02F 1/001; C02F 2201/006; C02F 9/00; C02F 1/40; Y02A 20/152; E02F 5/14; B01D 29/50; B01D 35/02; B01D 2221/12; B01D 24/008; B01D 35/147; B01D 36/04
See application file for complete search history.

(56) References Cited

U.S. PATENT DOCUMENTS

| | | |
|---|---|---|
| 2009/0045128 A1 | 2/2009 | Murray et al. |
| 2011/0056890 A1 | 3/2011 | Cobb |
| 2018/0229155 A1* | 8/2018 | Ma .................... C02F 1/385 |

OTHER PUBLICATIONS

International Preliminary Report on Patentability dated Jan. 5, 2021 in connection with International Application No. PCT/AU2018/000113.

* cited by examiner

WATER TREATMENT DEVICE

CROSS-REFERENCE TO RELATED APPLICATIONS

This application is a continuation of International Application No. PCT/AU2018/000113 having an international filing date of Jul. 4, 2018 entitled "A Water Treatment Device". The '113 international application is hereby incorporated by reference herein in its entirety.

FIELD OF THE INVENTION

The present invention relates to a water treatment device, and more particularly to a water treatment device for capturing and retaining pollutants in stormwater runoff.

Known stormwater treatment devices are typically designed to treat stormwater runoff by capturing and retaining gross pollutants such as litter, organic pollutants such as leaves and sticks, sediments, oil and scum, metals, and nutrients. Such known devices typically include an inlet pipe for receiving an incoming flow of water, a central component which may or may not include one or more filters, and an outlet pipe for discharging the flow of water. During heavy rainfall, the flow of water entering the device typically has a large volume and a high velocity. A disadvantage of such known devices during high flow conditions is that they may not adequately capture or retain the gross pollutants, or effectively treat other types of pollutants and particulates (e.g. finer sediments and oils/hydrocarbons) that may be present in stormwater runoff.

Known stormwater treatment devices may utilise a variety of treatment or filtration methods, such as settling chambers, or the use of filtration materials or membrane-type barriers, typically in isolation. Such known devices typically require complex hydraulic design considerations, such as large invert (i.e. base interior) level differences between the inlet and outlet pipes, and these devices are also typically required to be installed off-line from the main drainage conduit of a stormwater system. Such devices are also limited in their ability to treat a wide range of pollutants and particulates, thus requiring multiple devices to be installed in series in order to meet the required stormwater runoff quality targets. This may lead to increased time and labour costs associated with the fabrication, assembly, installation and maintenance of such devices. A large area (i.e. footprint) is also required to install multiple devices in series, which potentially decreases the amount of developable land available.

SUMMARY OF THE INVENTION

It is an object of the present invention to substantially overcome, or at least ameliorate, one or more disadvantages of existing arrangements, or to at least provide the public with a useful choice.

According to the present invention, there is provided a water treatment device comprising:
a main body in the form of a main chamber and having an upper portion, a lower portion, a main inlet for receiving a flow of water into the main body and a main outlet for discharging a flow of water from the main body;
an insert member disposed within the main chamber at the upper portion, the insert member including a return and bypass channel providing fluid communication between the main inlet and the main outlet;
a filter assembly disposed within the main chamber and below the insert member, the filter assembly including a treatment chamber in fluid communication with the inlet channel, the filter assembly being adapted for filtering water that flows through the filter assembly and including:
a first filter adapted for filtering coarse pollutants;
a second filter adapted for filtering standard particulates and soluble pollutants; and
a third filter adapted for filtering fine particulates;
a base member disposed within the main chamber and below the filter assembly, the base member being adapted for retaining the pollutants and particulates; and
an upflow passage providing fluid communication between the filter assembly and the main outlet via the return and bypass channel, the upflow passage being adapted to direct the flow of water from the filter assembly into the main outlet via the return and bypass channel.

Under a normal flow condition, the flow of water passing through the filter assembly may be maintained under hydraulic pressure at a flow rate in the range of between approximately 0.020 to 0.25 $m^3/s$.

Under a high flow condition, the flow of water may bypass the treatment chamber by way of the return and bypass channel and is discharged from the device directly via the main outlet.

The first filter may comprise an inner filter layer. In a preferred form, the first filter includes a plurality of perforations, each perforation having a diameter of about 1 mm.

The second filter may comprise an intermediate filter layer in the form of a granular activated carbon layer. In a preferred form, the granular activated carbon layer includes a plurality of activated carbon granules, each granule having a diameter of between 2 to 4 mm.

The third filter may comprise an outer filter layer in the form of a pleated cartridge filter for filtering fine particulates sized in the range of between approximately 2 microns (0.002 mm) to 5 microns (0.005 mm).

The main chamber may have a generally cylindrical shape, and the first, second and third filters may be arranged from an inner circumference adjacent to the treatment chamber to an outer circumference in a generally tubular form which corresponds to the generally cylindrical shape of the main chamber.

The insert member may include an inner portion arranged to extend into the treatment chamber, and the inner portion may be adapted to retain floating pollutants.

The inlet channel may include a pair of inlet channel bypass weirs adapted to regulate the flow of water under a normal flow condition into the treatment chamber or into the return and bypass channel.

The pair of inlet channel bypass weirs may each include a plurality of V-shaped notches.

The insert member may further include a rim weir surrounding the return and bypass channel, and the rim weir may include a series of V-shaped notches to guide the flow of water from the upflow passage into the return and bypass channel.

The main inlet may be located at a position that is higher than a position at which the main outlet is located. In a preferred form, the main inlet is located at a position that is approximately 150 mm higher than a position at which the main outlet is located.

The water treatment device may further include an upper watertight seal between the filter assembly and an underside of the insert member.

The water treatment device may also further include a lower watertight seal between the filter assembly and an upperside of the base member.

DETAILED DESCRIPTION OF ILLUSTRATIVE EMBODIMENT(S)

Figure 1:
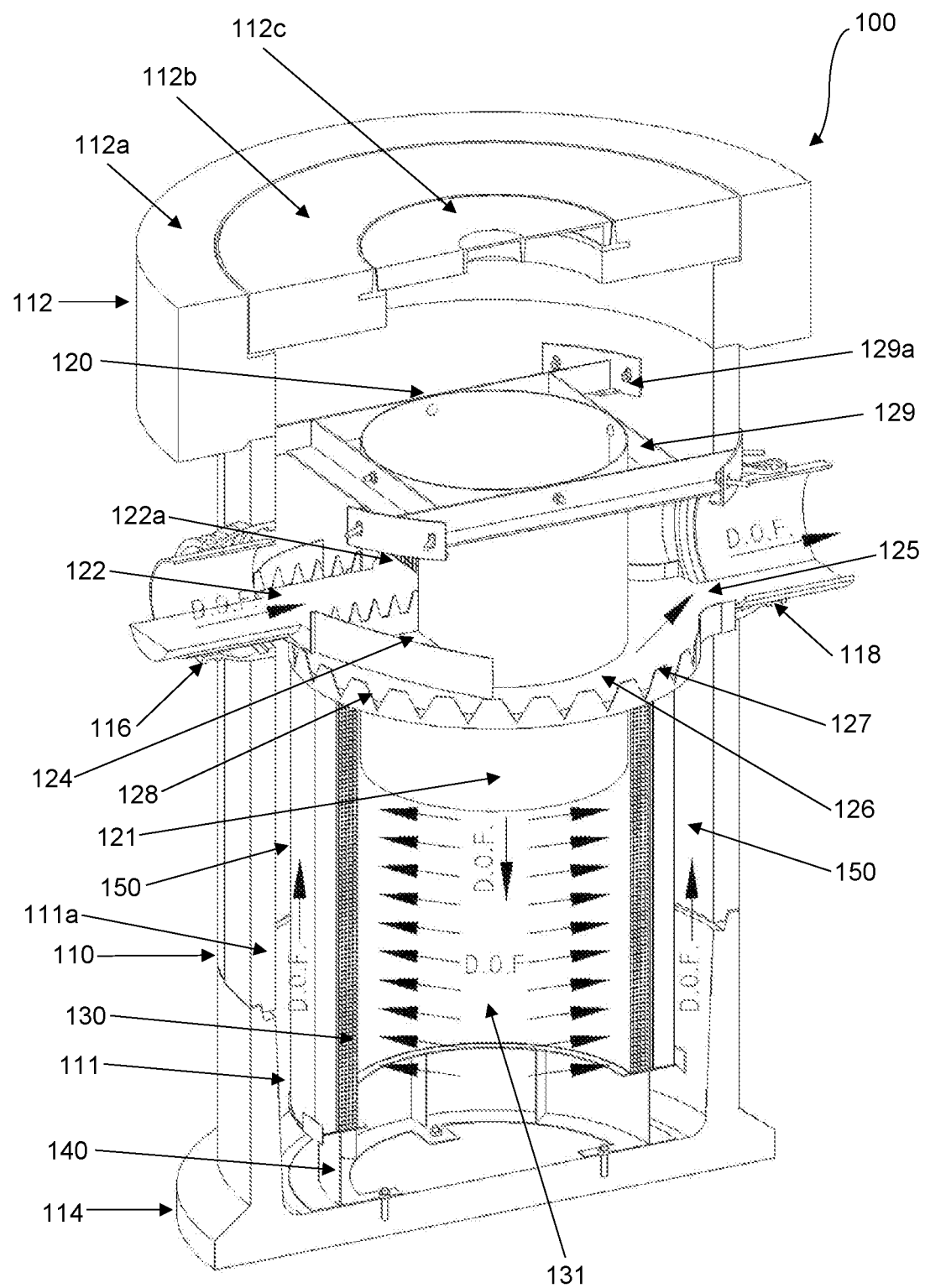
FIG. 1 is a cross-sectional perspective view of an embodiment of a water treatment device.
Figure 2:
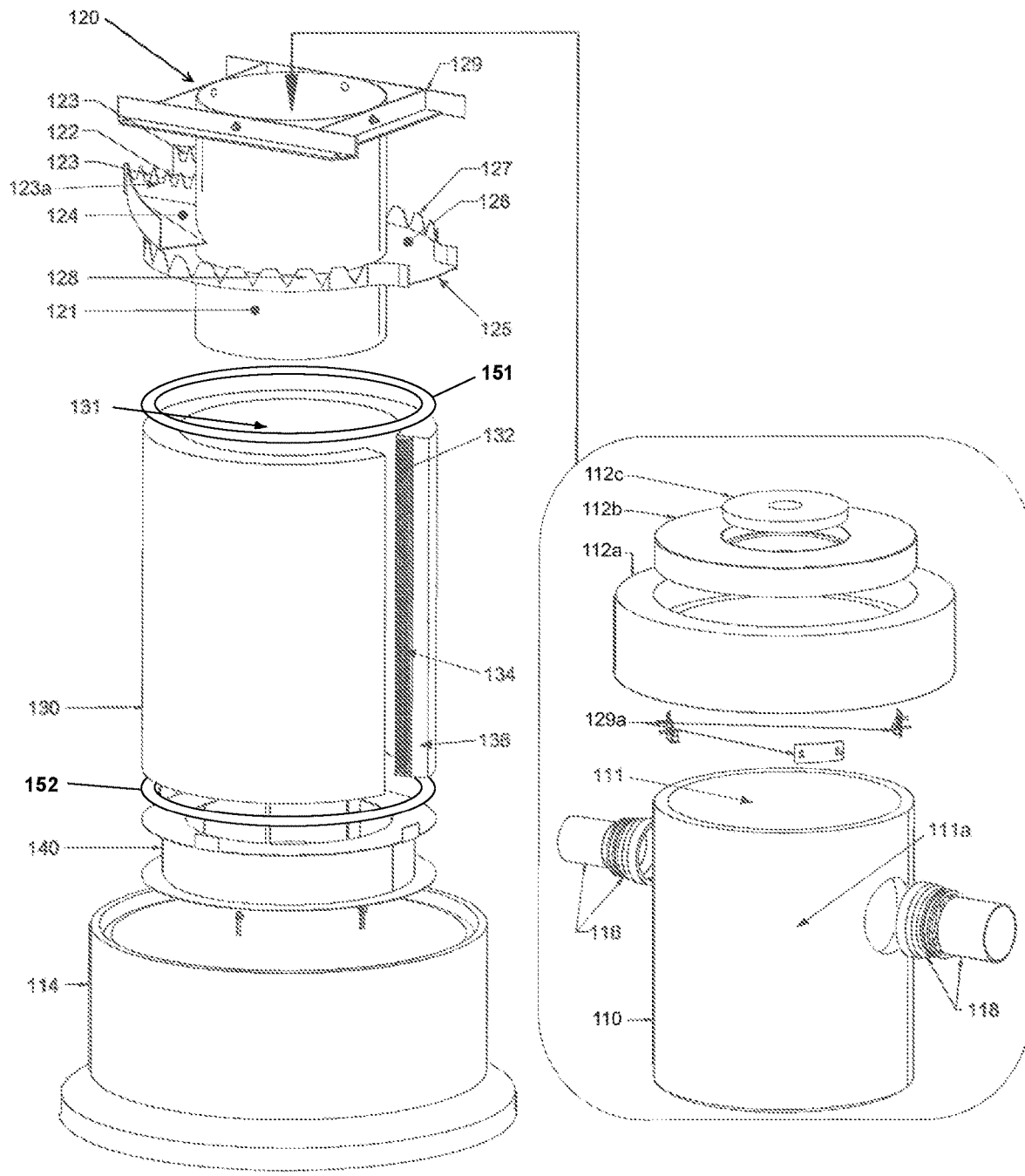
FIG. 2 is an exploded perspective view of the components of the water treatment device of FIG. 1.

FIGS. 1 and 2 show an embodiment of a water treatment device 100 including a main body 110, an insert member 120, a filter assembly 130, a base member 140 and an upflow passage 150. In the depicted embodiment, the main body 110 is generally in the form of an open-ended cylindrical main chamber 111 having a circular cross-section. The cylindrical main chamber 111 is defined by a wall 111a. The cylindrical main chamber 111 may have an internal diameter of between 1200 to 3600 mm, a height of between 2000 to 4000 mm, and a wall thickness of between 80 to 250 mm. It will be appreciated that the main body 110 may alternatively take the form of other suitably shaped chambers having a square or oval cross-section, for example. The main body 110 and insert member 120 may be formed of a stainless steel material, for example. Other suitable materials include concrete, fibreglass, plastic, or carbon fibre.

The main body 110 includes an upper portion 112, a lower (i.e. base) portion 114, a main inlet 116 and a main outlet 118. The upper portion 112 includes an outer ring member 112a, a main lid member 112b mounted within the outer ring member 112a, and an inspection lid member 112c mounted within the main lid member 112b. It will be appreciated that the main lid member 112b and the inspection lid member 112c are separately formed from the main body 110 and are thus removable to facilitate access into the chamber 111. The main lid member 112b and the inspection lid member 112c may each be formed of cast iron material, for example.

The main inlet 116 is adapted for receiving a flow of water (for example, stormwater runoff) into the main body 110. Conversely, the main outlet 118 is adapted for discharging a flow of water from the main body 110. The main inlet 116 and main outlet 118 each have a generally cylindrical form, having a diameter of between 100 to 750 mm. For a device installed on line, the diameter of the main outlet 118 is one pipe diameter larger than the diameter of the main inlet 116 to facilitate the flow of water through and out of the device 100. It will be appreciated that the invert (i.e. base interior) level of the main inlet 116 is higher than the invert level of the main outlet 118, thereby creating a hydraulic slope to facilitate the flow of water through the device 100. The main inlet 116 is therefore located at a position that is higher than a position at which the main outlet 118 is located. In the preferred form, the main inlet 116 is located at a position that is approximately 150 mm higher than a position at which the main outlet 118 is located.

In the depicted embodiment, the main outlet 118 is located generally opposite to the main inlet 116, i.e. on opposite ends of a 180° arc on the wall 111a of the cylindrical main chamber 111. However, it will be appreciated that in other embodiments (not shown), the main outlet 118 may be located anywhere within a 270° arc on the wall 111a of the cylindrical main chamber 111, relative to the main inlet 116. In such embodiments, the device 100 may be utilised to change a direction of flow of the water through the device 100, for example, during alignment or re-alignment of stormwater pipelines.

The insert member 120 is configured to be disposed within the main chamber 111 adjacent to and below the upper portion 112 of the main body 110. The insert member 120 includes a generally cylindrical inner portion 121 that is arranged to extend into the main chamber 111 of the main body 110. The inner portion 121 also extends into the filter assembly 130, and forms a storage zone for the capture and retention of floating pollutants such as oil and scum. The cylindrical inner portion 121 may have a diameter of between 650 to 2300 mm, a height of between 700 to 2000 mm.

The insert member 120 includes an inlet channel 122, an outlet channel 125, and a return and bypass channel 126. The inlet channel 122 provides fluid communication between the main inlet 116 and the filter assembly 130 via an opening 122a in the inner portion 121. It will be appreciated that the inlet channel 122 has a width that is larger than the diameter of the main inlet 116, such that the depth and flow rate of the water entering the filter assembly 130 may be reduced. It is envisaged that the inlet channel 122 may have a width ranging from between 125 to 825 mm, whilst the main inlet 116 may have a width ranging from between 100 to 750 mm. The insert member 120 also includes a pair of inlet channel bypass weirs 123 located on either side of the inlet channel 122, and an inlet channel bypass passage 124 providing fluid communication between the inlet channel 122 and the return and bypass channel 126. The inlet channel bypass weirs 123 each have a height ranging from between 80 to 410 mm. The inlet channel bypass weirs 123 each include a plurality of notches 123a which provides fluid communication between the inlet channel 122 and the bypass passage 124. In the depicted embodiment, each of the notches 123a are generally V-shaped, however it will be appreciated that each of the notches 123a may be in any other shape suitable for facilitating fluid communication and/or regulating fluid flow. Each of the notches 123a may have a width ranging from between 30 to 60 mm. It will be appreciated that the number and dimensions of the notches 123a may be increased or decreased, depending on a particular requirement of the device 100, such as the required diameter of the main inlet 116, the required gradient, and the required flow rate under a normal flow condition.

It is envisaged that the inlet channel bypass passage 124 may have a width ranging from between 175 to 525 mm. In the depicted embodiment, the inlet channel bypass passage 124 is arranged at an incline to guide the flow of water from the inlet channel 122 into the return and bypass channel 126. The incline angle of the inlet channel bypass passage 124 may range from between 11 to 12° relative to the horizontal return and bypass channel 126.

The outlet channel 125 provides fluid communication between the upflow passage 150, the return and bypass channel 126, and the main outlet 118. The return and bypass channel 126 provides fluid communication between the inlet channel 122 and the outlet channel 125, whereby the return and bypass channel 126 allows a flow of water entering the main inlet 116 to bypass the filter assembly 130 and be discharged directly via the main outlet 118. The insert member 120 further includes a rim weir 127 surrounding the return and bypass channel 126. The rim weir 127 includes a series of notches 128 which provides fluid communication between the return and bypass channel 126 and the upflow passage 150. In the depicted embodiment, each notch 128 is generally V-shaped, however it will be appreciated that each notch 128 may be in any other shape, such as a U-shape, that is suitable for facilitating fluid communication and/or regulating fluid flow. It will be appreciated that each notch 128 acts as an orifice to throttle the flow of water entering the return and bypass channel 126 to a suitable treatment flow rate of the filter assembly 130, and to control the flow of water through or over the rim weir 127. Each notch 128 may also maintain a constant velocity in the flow of water in the return and bypass channel 126. The rim weir 127 may have a height ranging from between 65 to 150 mm, and the upper region of each notch 128 may have a width ranging from between 60 to 75 mm.

It will be appreciated that the insert member 120 forms the main hydraulic control element of the device 100, whereby the dimensions of the various components of the insert member 120 may be adjusted so as to re-distribute and balance the flow of water entering and leaving the device 100 according to a particular requirement.

The insert member 120 further includes a support frame 129 to mount the insert member 120 in the main chamber 111 of the main body 110. In the depicted embodiment, the insert member 120 is mounted to the support frame 129 and the wall 111a of the main body 110 by way of one or more support brackets 129a. The support frame 129 may alternatively be mounted to the wall 111a of the main chamber 111 by way of screws, nuts and bolts, or any other suitable means of mechanical attachment.

The filter assembly 130 is disposed within the main chamber 111 below the insert member 120. The water treatment device 100 further includes an upper watertight seal 151 between the filter assembly 130 and an underside of the return and bypass channel 126 of the insert member 120. The filter assembly 130 includes a generally cylindrical inner treatment chamber 131, which is in fluid communication with the inlet channel 122 via the opening 122a. The inner portion 121 of the insert member 120 also extends into the treatment chamber 131. The filter assembly 130 is adapted for filtering water that flows into the treatment chamber 131 and through the filter assembly 130. The filter assembly 130 includes a first filter 132, a second filter 134 and a third filter 136. As best shown in FIG. 2, each of the first, second and third filters 132, 134 and 136 are arranged as layers from an inner circumference adjacent the inner treatment chamber 131 to an outer circumference in a generally tubular form which corresponds to the generally cylindrical shape of the main chamber 111.

The first filter 132 includes an inner filter layer adapted for filtering litter and other coarse pollutants such as leaves and sticks that may be present in stormwater runoff. The first filter 132 includes a plurality of perforations, each having a diameter ranging between 0.75 to 1.25 mm. In a preferred form, each of the perforations have a diameter of approximately 1 mm. The first filter 132 may be formed of a sheet of stainless steel material having a thickness of approximately 1 mm. It will be understood that the first filter 132 forms the innermost layer at an inner circumference of the generally tubular filter assembly 130.

The second filter 134 includes an intermediate filter layer generally in the form of a granular layer and is adapted for filtering standard particulates and soluble pollutants. Examples of such standard particulates and soluble pollutants that may be present in stormwater runoff include sediments/particles down to approximately 150 micron in size, soluble and particulate nutrients such as nitrogen and phosphorous, and soluble and particulate metals such as lead, zinc and iron. In a preferred embodiment, the granular layer is a granular activated carbon layer, which may also capture and retain oils/hydrocarbons. The granular activated carbon layer includes a plurality of activated carbon granules, each granule having a diameter of between 2 to 4 mm. The granular activated carbon layer may be enclosed by a sheet of stainless steel material having a thickness of approximately 1 mm, and including perforations with a diameter of approximately 1 mm. It will be appreciated that the granular activated carbon layer is removable and replaceable, depending on the type of particulates and pollutants being filtered. It will be understood that the second filter layer 134 forms the intermediate layer at an intermediate circumference of the generally tubular filter assembly 130, i.e. the layer that is located between the first filter 132 and third filter 136.

The third filter 136 includes an outer filter layer generally in the form of a pleated cartridge filter and is adapted for filtering fine particulates sized in the range of between approximately 2 microns (0.002 mm) to 5 microns (0.005 mm). Examples of such fine particulates that may be present in stormwater runoff include very fine sediments/particles down to approximately 2 micron in size, particulate nutrients such as nitrogen and phosphorous, and particular metals such as lead, zinc and iron. It will be understood that the third filter 136 forms the outermost layer at an outer circumference of the generally tubular filter assembly 130.

It is envisaged that each of the first, second and third filters 132, 134 and 136 are removable and replaceable, depending on the particular requirements of the water treatment device 100. Such requirements would be determined by, for example, the size and type of pollutants and particulates being targeted, and the flow rate of the water entering the device 100. It is envisaged that the device 100 may be configured with any combination and number of filter layers, from a single filter layer, to two or more filter layers.

The base member 140 is disposed in the main chamber 111 at the lower portion 124 of the main body 110 and below the filter assembly 130. The water treatment device 100 further includes a lower watertight seal 152 between the filter assembly 130 and an upperside of the base member 140. It will be appreciated that the base member 140 may be in the form of a plinth which creates a sump for retaining the pollutants and particulates that enter the filter assembly 130. This allows at least some of the pollutants and particulates to settle on the base member 140, thereby keeping the filter assembly 130 free from blockage. The base member 140 may be formed of a stainless steel material, for example.

The upflow passage 150 is disposed within the chamber 111 and provides fluid communication between the filter assembly 130 and the main outlet 118 via the return and bypass channel 126 and the outlet channel 125. In the depicted embodiment, the upflow passage 150 is defined by the space between the wall 111a of the main chamber 111 and the filter assembly 130. The upflow passage 150 is arranged to surround the filter assembly 130. The upflow passage 150 is adapted to direct the flow of water from the filter assembly 130 and into the main outlet 118 via the return and bypass channel 126 and outlet channel 125.

The operation of the water treatment device 100 under a normal flow condition will now be described. It would be understood by a person skilled in the art that a normal flow condition is generally indicated by a controlled incoming flow rate of water (also known in the art as a Treatment Flow Rate) of between 0.020 to 0.25 m3/s.

The water treatment device 100 is installed in-line within a main drainage conduit of an existing stormwater pipeline arrangement, whereby the main inlet 116 is positioned to receive an incoming flow of water, e.g. stormwater runoff. It will be appreciated that the water treatment device 100 may be installed on a range of pipeline gradients, from slight to mild, with a maximum gradient of 5 percent. The incoming flow of water travels through the main inlet 116 and into the inlet channel 122 of the insert member 120. This is generally indicated by the Direction of Flow (D.O.F.) arrows shown in FIG. 1. As the width of the inlet channel 122 is larger than the diameter of the main inlet 116, the depth and flow rate of the water traveling into the inlet channel 122 is reduced, thereby dissipating some of the energy being carried by the flow of water. The flow of water travels from the inlet channel 122, through the opening 122a and downwards into the treatment chamber 131. The flow of water then travels radially outwardly through the filter assembly 130, as generally indicated by the D.O.F. arrows shown in FIG. 1. Under this normal flow condition, the flow of water passing through the filter assembly 130 is maintained under hydraulic pressure at a required treatment flow rate, which allows the flow of water to be distributed evenly across the filter assembly, thereby avoiding blockage of the filter assembly 130. As discussed above, it will be understood that the required treatment flow rate will vary depending on a particular requirement of the device 100, and may range from between 0.020 to 0.25 m3/s.

The flow of water passing through the filter assembly 130 is filtered (in sequential order) by the first filter 132, the second filter 134, and the third filter 136. The pollutants and particulates that are captured by the first filter 132 will fall and settle into a region encompassed by the base member 140 at the bottom of the main chamber 111. Pollutants and particulates passing through the second and third filters 134 and 136 are caught within the filter matrix as a matter of course, whereby the pollutants and particulates are captured and retained.

The flow of filtered water passing through the filter assembly 130 then travels into the upflow passage 150, which directs the flow of filtered water upwards (i.e. in the direction of the insert member 120). The flow of filtered water through the upflow passage 150 is generally indicated by the D.O.F. arrows shown in FIG. 1. The flow of filtered water then enters the insert member 120 via the series of notches 128. The flow of filtered water travels through the series of notches 128, into the return and bypass channel 126, through the outlet channel 125 and out of the main body 110 via the main outlet 118.

The operation of the water treatment device 100 under a high flow condition will now be described. It would be understood by a person skilled in the art that a high flow condition is generally indicated by an incoming flow rate of water that is in excess of the given Treatment Flow Rate, i.e. up to approximately 0.911 m3/s.

Under a high flow condition, the water treatment device 100 operates in substantially the same manner as described above under a normal flow condition, with the additional use of the return and bypass channel 126. It would be understood that under this high flow condition, the volume of the incoming flow of water into the device 100 is higher than the volumetric capacity of the filter assembly 130. The return and bypass channel 126 may therefore be utilised to avoid blockage of the device 100 with excess water flow. Under this high flow condition, the water surface level in the inlet channel 122 exceeds the height of the inlet channel bypass weirs 123, such that the incoming flow of water entering the device 100 overtops the inlet channel bypass weirs 123 and cascades down into the inlet channel bypass passage 124, directly onto the return and bypass channel 126, and directly to the main outlet 118. At this stage, the flow of unfiltered water is mixed with the flow of filtered water exiting the main chamber 111 via the upflow passage 150 and the series of notches 128. The flow of filtered and unfiltered water then exits the device 100 in the same manner as described above, i.e. through the outlet channel 125 and out of the main body 110 via the main outlet 118.

It will be appreciated that, following any given amount of time that the water treatment device 100 resides within a stormwater pipe, the pollutants and particulates that are captured by the filter assembly 130 and the base member 140 may be accessed via the main lid member 112b and/or the inspection lid member 112c, and removed from the device 100. The insert member 120 may also be completely removed from the main chamber 111 to allow for ease of access to the filter assembly 130. The first, second and/or third filters 132, 134, 136 of the filter assembly 130 may then be removed and replaced. The pollutants and particulates that have settled on the base member 140 may then be accessed for removal, e.g. by vacuuming.

Various forms of the water treatment device 100 described above may have one or more of the following advantages. The device 100 has a clean and flexible design with a small footprint, which may at least allow the various non-moving components to be easily assembled and installed in an existing stormwater system. Accordingly, the amount of time and labour costs associated with fabrication, transportation, assembly and installation may be reduced. The various components of the device 100 may also be scalable based on different conditions or requirements of the device 100, for example, the type of pollutants and particulates being targeted, the incoming flow rate of water (i.e. the Treatment Flow Rate), the flux capacity of each of the filters 132, 134 and 136, and the residence time of any one of the filters 132, 134 and 136 within the device 100. It is envisaged that the filter assembly 130 may be arranged to specifically target a particular pollutant from a particular pollutant source. It is also envisaged that the device 100 may be arranged in a variety of sizes having a range of storage capacities and treatment flow rates. The device 100 may therefore be utilised for a wide range of stormwater pipe sizes and gradients. As the device 100 is designed as a single unit for capturing and retaining different types of pollutants and particulates, the need (and associated time and labour costs) to install multiple devices in series may be avoided. The arrangement of the return and bypass channel 126 may at least ensure that under high flow conditions, the device 100 does not impede the flow of water or create any blockages in the stormwater system. As the likelihood of blockages may be reduced, there is less of a need to perform frequent maintenance checks on the device 100, thereby reducing the time and labour costs associated with the maintenance of the device 100.

Although the invention has been described with reference to preferred embodiments, it will be appreciated by persons skilled in the art that the invention may be embodied in many other forms. For example, other forms of the device 100 may include rectangular arrangements with the use of panel-styled filter components. It is envisaged that the device 100 may be installed in an off line arrangement for very large pipe diameters on very steep gradients.

What is claimed is:
1. A water treatment device comprising:
   a main body in the form of a main chamber and having an upper portion, a lower portion, a main inlet for receiving a flow of water into the main body and a main outlet for discharging a flow of water from the main body;

an insert member disposed within the main chamber at the upper portion, the insert member including a return and bypass channel providing fluid communication between the main inlet and the main outlet;

a filter assembly disposed within the main chamber and below the insert member, the filter assembly including a treatment chamber in fluid communication with the main inlet, the filter assembly being adapted for filtering water that flows through the filter assembly and including:
- a first filter adapted for filtering coarse pollutants;
- a second filter adapted for filtering standard particulates and soluble pollutants; and
- a third filter adapted for filtering fine particulates;

a base member disposed within the main chamber and below the filter assembly, the base member being adapted for retaining the pollutants and particulates; and an upflow passage providing fluid communication between the filter assembly and the main outlet via the return and bypass channel, the upflow passage being adapted to direct the flow of water from the filter assembly into the main outlet via the return and bypass channel.

2. The water treatment device of claim 1, wherein under a normal flow condition, the flow of water passing through the filter assembly is maintained under hydraulic pressure at a flow rate in the range of between approximately 0.020 to 0.25 m3/s.

3. The water treatment device of claim 2, wherein under a high flow condition, the flow of water bypasses the treatment chamber by way of the return and bypass channel, and is discharged from the water treatment device directly via the main outlet.

4. The water treatment device of claim 2, wherein the first filter comprises an inner filter layer.

5. The water treatment device of claim 1, wherein under a high flow condition, the flow of water bypasses the treatment chamber by way of the return and bypass channel, and is discharged from the water treatment device directly via the main outlet.

6. The water treatment device of claim 1, wherein the first filter comprises an inner filter layer.

7. The water treatment device of claim 6, wherein the first filter includes a plurality of perforations, each perforation having a diameter of about 1 mm.

8. The water treatment device of claim 6, wherein the second filter comprises an intermediate filter layer in the form of a granular activated carbon layer.

9. The water treatment device of claim 1, wherein the second filter comprises an intermediate filter layer in the form of a granular activated carbon layer.

10. The water treatment device of claim 9, wherein the granular activated carbon layer includes a plurality of activated carbon granules, each granule having a diameter of between 2 to 4 mm.

11. The water treatment device of claim 1, wherein the third filter comprises an outer filter layer in the form of a pleated cartridge filter for filtering fine particulates sized in the range of between approximately 2 microns (0.002 mm) to 5 microns (0.005 mm).

12. The water treatment device of claim 1, wherein the main chamber has a generally cylindrical shape, and the first filter, the second filter and third filter are arranged from an inner circumference adjacent to the treatment chamber to an outer circumference in a generally tubular form which corresponds to the generally cylindrical shape of the main chamber.

13. The water treatment device of claim 1, wherein the insert member includes an inner portion arranged to extend into the treatment chamber, the inner portion being adapted to retain floating pollutants.

14. The water treatment device of claim 1, wherein a inlet channel includes a pair of inlet channel bypass weirs adapted to regulate the flow of water under a normal flow condition into the treatment chamber or into the return and bypass channel.

15. The water treatment device of claim 14, wherein the pair of inlet channel bypass weirs each include a plurality of V-shaped notches.

16. The water treatment device of claim 1, wherein the insert member further includes a rim weir surrounding the return and bypass channel, the rim weir including a series of V-shaped notches to guide the flow of water from the upflow passage into the return and bypass channel.

17. The water treatment device of claim 1, wherein the main inlet is located at a location that is higher than a position at which the main outlet is located.

18. The water treatment device of claim 17, wherein the main inlet is located at said location that is approximately 150 mm higher than said position at which the main outlet is located.

19. The water treatment device of claim 1, further including an upper watertight seal between the filter assembly and an underside of the insert member.

20. The water treatment device of claim 1, further including a lower watertight seal between the filter assembly and an upperside of the base member.

* * * * *